United States Patent
Cook

(10) Patent No.: US 8,733,477 B1
(45) Date of Patent: May 27, 2014

(54) SPEED CONTROL SYSTEM FOR EARTH WORKING APPARATUS

(75) Inventor: David M. Cook, Prospect, KY (US)

(73) Assignee: The Toro Company, Bloomington, MN (US)

( * ) Notice: Subject to any disclaimer, the term of this patent is extended or adjusted under 35 U.S.C. 154(b) by 807 days.

(21) Appl. No.: 12/911,609

(22) Filed: Oct. 25, 2010

Related U.S. Application Data

(63) Continuation-in-part of application No. 12/644,335, filed on Dec. 22, 2009, now Pat. No. 8,291,991.

(51) Int. Cl.
  *B62D 11/00* (2006.01)
  *B62D 11/18* (2006.01)
  *A01B 45/02* (2006.01)

(52) U.S. Cl.
  CPC .............. *B62D 11/183* (2013.01); *A01B 45/02* (2013.01)
  USPC .......................................... 180/6.32; 172/42

(58) Field of Classification Search
  USPC ....................................................... 180/6.32
  See application file for complete search history.

(56) References Cited

U.S. PATENT DOCUMENTS

| | | |
|---|---|---|
| 1,130,366 A | 3/1915 | Babcock |
| 1,157,670 A | 10/1915 | Boswell |
| 1,778,334 A | 10/1930 | Pedersen |
| 2,154,720 A | 4/1935 | Biles |
| 2,117,065 A | 5/1938 | Lassas |
| 2,164,845 A | 7/1939 | Steed et al. |
| 2,205,997 A | 6/1940 | Wallace et al. |
| 2,229,497 A | 1/1941 | Dontje |
| 2,234,534 A | 3/1941 | Reno |
| 2,260,110 A | 10/1941 | Blohm |
| 2,401,796 A | 6/1946 | Raitch |
| 2,450,749 A | 10/1948 | Clark |
| 2,619,887 A | 12/1952 | Burrows |
| 2,649,061 A | 4/1953 | Hawkins et al. |
| 2,713,816 A | 7/1955 | Berg |
| 2,750,859 A | 6/1956 | Smithburn |
| 2,823,597 A | 2/1958 | Kelsey |
| 2,835,182 A | 5/1958 | Smithburn |
| 2,888,994 A | 6/1959 | Hoff et al. |
| 3,429,378 A | 2/1969 | Mascaro |
| 3,675,724 A | 7/1972 | Schneider |
| 3,746,101 A | 7/1973 | Takata |
| 3,889,761 A | 6/1975 | Rogers |
| 4,192,387 A | 3/1980 | Stinson |
| 4,196,678 A | 4/1980 | Lore et al. |
| 4,258,634 A | 3/1981 | Lore et al. |

(Continued)

FOREIGN PATENT DOCUMENTS

| | | |
|---|---|---|
| CA | 366396 A | 5/1937 |
| EP | 0140989 A1 | 5/1985 |

(Continued)

*Primary Examiner* — Tony Winner
(74) *Attorney, Agent, or Firm* — Middleton Reutlinger; Robert H. Eichenberger; Scott W. Higdon

(57) ABSTRACT

A speed control system for an earth working apparatus. The speed control system includes a steering structure and a speed control lever movably coupled to the steering structure. The speed control lever may be operatively coupled to a self propel system of the earth working apparatus. The speed control lever is at rest in a neutral position, is actuable in a first direction for forward movement of the apparatus, and may be actuable in a second direction for rearward movement of the apparatus.

30 Claims, 13 Drawing Sheets

(56) References Cited

U.S. PATENT DOCUMENTS

| | | | |
|---|---|---|---|
| 4,336,760 A | 6/1982 | Cohen et al. | |
| 4,438,873 A | 3/1984 | Kaercher, Jr. | |
| 4,492,271 A | 1/1985 | Doering | |
| 4,519,459 A | 5/1985 | Reaume | |
| 4,550,783 A | 11/1985 | Hansen | |
| 4,602,687 A | 7/1986 | Hansen | |
| 4,606,411 A | 8/1986 | Classen | |
| 4,606,412 A | 8/1986 | Classen | |
| 4,632,189 A | 12/1986 | Rizzo | |
| 4,645,012 A | 2/1987 | Hansen et al. | |
| 4,750,565 A | 6/1988 | Hansen et al. | |
| 4,753,298 A | 6/1988 | Hansen et al. | |
| 4,773,486 A * | 9/1988 | Huber et al. | 172/22 |
| 4,811,794 A | 3/1989 | Greene | |
| 4,867,244 A * | 9/1989 | Cozine et al. | 172/22 |
| 4,926,947 A | 5/1990 | Cozine et al. | |
| 5,009,270 A | 4/1991 | Vangsgard | |
| 5,101,910 A | 4/1992 | Dawson | |
| 5,307,952 A | 5/1994 | Worrel et al. | |
| 5,307,965 A | 5/1994 | Worrel et al. | |
| 5,398,767 A | 3/1995 | Warke | |
| 5,454,433 A | 10/1995 | Worrel et al. | |
| 5,478,104 A | 12/1995 | Worrel et al. | |
| 5,560,432 A | 10/1996 | Conte | |
| 5,571,252 A | 11/1996 | Worrel et al. | |
| 5,673,756 A * | 10/1997 | Classen | 172/22 |
| 5,680,903 A | 10/1997 | Oliver | |
| 5,713,420 A | 2/1998 | Roberts et al. | |
| 5,794,708 A | 8/1998 | Brophy | |
| 5,802,994 A | 9/1998 | Kinkead et al. | |
| 5,890,545 A | 4/1999 | Smith et al. | |
| 5,988,669 A * | 11/1999 | Freese et al. | 280/642 |
| 6,024,033 A | 2/2000 | Kinkead et al. | |
| 6,058,860 A | 5/2000 | Kinkead et al. | |
| 6,102,129 A | 8/2000 | Classen | |
| 6,139,046 A * | 10/2000 | Aalund et al. | 280/642 |
| 6,149,079 A | 11/2000 | Kinkead et al. | |
| 6,179,061 B1 | 1/2001 | Fiore | |
| 6,241,025 B1 | 6/2001 | Myers et al. | |
| 6,273,197 B1 | 8/2001 | Marlow | |
| 6,415,872 B2 | 7/2002 | Myers et al. | |
| 6,585,451 B2 | 7/2003 | Wynings | |
| 6,708,773 B1 | 3/2004 | Kinkead et al. | |
| 6,758,283 B2 * | 7/2004 | Lauer et al. | 172/22 |
| 6,823,947 B2 | 11/2004 | Nagaoka et al. | |
| 6,892,821 B2 | 5/2005 | Wessel | |
| 7,100,702 B2 | 9/2006 | Classen | |
| 7,290,619 B2 | 11/2007 | Maas et al. | |
| 7,540,102 B2 * | 6/2009 | Olmr et al. | 37/245 |
| 2004/0149457 A1 * | 8/2004 | Yamazaki et al. | 172/42 |

FOREIGN PATENT DOCUMENTS

| | | |
|---|---|---|
| EP | 0870420 A1 | 10/1998 |
| GB | 191004201 A | 0/1910 |
| GB | 191029804 A | 0/1911 |
| GB | 143999 A | 6/1920 |
| GB | 472443 A | 9/1937 |
| GB | 2347400 | 9/2000 |
| JP | 8318745 A | 12/1996 |
| JP | 2003180107 | 7/2003 |
| JP | 2003180107 A | 7/2003 |

* cited by examiner

US 8,733,477 B1

SPEED CONTROL SYSTEM FOR EARTH WORKING APPARATUS

CROSS-REFERENCE TO RELATED DOCUMENTS

This application is a continuation-in-part of currently pending application Ser. No. 12/644,335 filed Dec. 22, 2009 and entitled Walk Behind Soil Aerator, which is hereby incorporated by reference in its entirety.

TECHNICAL FIELD

The present invention relates generally to aspects of a speed control system. More particularly, various inventive methods and apparatus disclosed herein relate to a speed control system for a walk behind earth working apparatus.

BACKGROUND

A walk behind earth working apparatus penetrates and/or moves earth during operation thereof while a user walks behind the apparatus or follows behind the apparatus on a chariot type attachment. A walk behind earth moving apparatus includes, for example, a walk behind soil aerator. Several different types of soil aerators with rotating tines are known. On all these aerators, the tines are mounted on shafts for rotation about an axis, and, as each tine rotates, it pierces the ground and pulls up a plug of soil.

The fact that the aerator tines dig into the soil makes aerators much more difficult to maneuver than a typical piece of lawn equipment, like a lawn mower, which remains entirely on top of the ground, because the tines that are sticking into the ground limit the ability of the aerator to move along the ground. As a result, aerators generally travel in a straight line, have a very large turning radius and are very difficult to handle. Each type of aerator uses a somewhat different mechanism for reducing the interference of the tines when making a turn.

First, there are aerators that are pulled behind a tractor. The tines on these aerators are not driven. They simply free-wheel about a shaft as the aerator frame is pulled along by the tractor. These aerators typically include several different tine assemblies mounted for freewheeling about a single shaft. These aerators can make wide turns, with the individual tine assemblies free-wheeling at varying speeds to accommodate the turning aerator as the tractor pulls the aerator along. There still may be some resistance and some dragging of tines that are inserted into the soil as the aerator is pulled around a curve, which can tear up turf and is undesirable, but, if a large enough radius of curvature is used, the result is generally acceptable.

Next, there are walk-behind aerators, which include a frame with an internal combustion engine which typically uses a belt drive (or drives) to drive the tine assemblies. The driven tines dig into the soil and propel the aerator forward along the ground as they rotate, with the human operator walking behind the aerator to steer it and control it. Some of these aerators can be driven around curves if a large radius of curvature is used, particularly if they use a differential to enable the outer tines to rotate at a faster speed than the inner tines while the tine assemblies are being driven. However, they rely on the use of a clutch to disengage the drive to the aerator tines so the tine assemblies become freewheeling in order to reduce the amount of interference from the tines when the operator wants to make a tight turn or wants to pull the aerator backwards.

Finally, there are large, riding aerators, on which the operator stands or sits. These riding aerators typically have separate, left and right hydrostatic drives, which separately drive left and right sets of tine assemblies. The operator may speed up one set of rotating tines and slow down another to make a wide turn. To make sharp turns, the operator stops the aerator, raises the tines out of the ground to get them completely out of the way, then drives the aerator to the desired position, then stops and lowers the tines back into the ground and then begins driving the tines again.

So, as explained above, all the aerators rely on some mechanism to get the tines out of the way in order to be able to make tight turns or other difficult maneuvers—either allowing the tine assemblies to freewheel or raising the tine assemblies entirely out of the ground during the difficult maneuver.

The aerator described by Kinkead in U.S. Pat. No. 6,708,773 is an example of a walk-behind aerator which uses a belt drive with a clutch mechanism that allows the operator to disengage the drive and allow the tines to freewheel during difficult maneuvers. It additionally facilitates turning by driving the left and right sets of tines through a differential, and through the use of left side and right side individual brakes, to manually overcome the resistance associated with making wide turns while the tines are in the ground, as described below. However, this arrangement is still very difficult for the operator to maneuver.

If the operator wants to make a large radius turn, he either pulls back on the handle on one side of the aerator or uses a brake to slow down the tines on one side of the aerator while pushing on the other side to direct the aerator into the turn. Due to the way a differential works, when the inner set of tines is moving very slowly or is stationary, the outer set of tines rotates at twice the normal speed, so the operator often finds himself running to keep up with the aerator as it makes the wide turn.

If the operator wants to make a tight turn, he disengages the clutch to make the tines freewheeling to minimize their interference with the maneuver, and then he pushes the aerator manually around the tight turn. After completing the tight turn, he re-engages the clutch, which causes the aerator to jerk forward as the tines begin driving again.

If the operator wants to back up this walk-behind aerator, he again disengages the clutch to make the tines freewheeling, and he then manually pulls the aerator backwards. This can require a substantial amount of human strength, especially if it involves pulling the aerator uphill, which even may be impossible in some situations.

SUMMARY

The present disclosure is directed to aspects of a speed control system for a walk behind earth working apparatus. For example, some aspects of the present disclosure are directed to a speed control system for a soil aerator that comprises a steering handle and a speed control lever. The speed control lever may optionally be interposed between the steering handle and an operator space located rearward of the soil aerator. The speed control lever is actuable to a plurality of forward speed directions and may be actuable to a plurality of rearward speed directions.

Generally, in one aspect a speed control system for an earth working apparatus is provided and includes a steering structure and a speed control lever. The steering structure includes first steering handle support structure, second steering handle support structure, and a steering handle. The first steering handle support structure and the second steering handle support structure may be in substantially parallel spaced relation with one another and generally define a first plane. The steering handle may be coupled to the first steering handle support structure and the second steering handle support structure and include a first handgrip structure and a second handgrip structure that extend generally in a second plane that is non-parallel to the first plane. The first handgrip structure and the second handgrip structure converge toward one another at a non-parallel angle with respect to one another. The speed control lever is movably coupled to the steering structure and coupled to a control cable. The speed control lever has a neutral position when substantially no force is applied to the control cable by a user, a full forward position when full forward force is applied to the control cable in a first direction by the user, and a full reverse position when full rearward force is applied to the control cable in a second direction by the user. The speed control lever is most proximal the steering handle in the full forward position, the speed control lever is most distal the steering handle in the full rearward position, and the speed control lever is in between the full forward position and the full rearward position in the neutral position.

In some embodiments the speed control lever and the steering handle have a substantially similar shape.

In some embodiments the steering handle limits movement of the speed control lever when the speed control lever is in the full forward position. In some versions of those embodiments the speed control lever directly contacts the steering handle when the speed control lever is in the full forward position.

In some embodiments the first handgrip structure and the second handgrip structure are disposed at an angle with respect to one another that is in the range of approximately one-hundred to approximately one-hundred-seventy degrees.

In some embodiments the steering handle includes a transition portion extending between the first handgrip structure and the second handgrip structure. In some versions of those embodiments the transition portion is a curvate apex.

In some embodiments a spacing between the first handgrip structure and the speed control lever in the neutral position is sufficiently small to allow a user's fingers on a first hand to contact the handgrip structure while the user's thumb on the first hand contacts the speed control lever. In some versions of those embodiments the spacing is less than or equal to four inches.

In some embodiments the steering handle, the first steering handle support structure, and the second steering handle support structure are monolithically formed.

In some embodiments the second plane is at approximately a forty-five to ninety degree angle with respect to the first plane.

In some embodiments the speed control lever intersects the first plane in the neutral position.

In some embodiments the control cable is coupled to a biasing spring that biases the speed control lever in the neutral position when no force is applied to the speed control lever.

Generally, in another aspect, an earth working apparatus is provide that includes a self propel system, a steering structure, and a speed control lever. The self propel system provides the apparatus with powered movement over the ground at a forward variable speed and at a reverse variable speed. The steering structure extends rearwardly from the apparatus and includes a steering handle having a first handgrip structure and a second handgrip structure converging toward one another at an angle of approximately ninety-five to one-hundred-seventy degrees with respect to one another. The speed control lever is movably coupled to the steering structure and operatively coupled to the self propel system. The speed control lever has a neutral position whereby the housing is not provided with powered movement, a full forward position whereby the housing is provided with powered movement at a full forward speed, and a full reverse position whereby the housing is provided with powered movement at a full reverse speed. The speed control lever is most proximal the steering handle in the full forward position, the speed control lever is most distal the steering handle in the full rearward position, and the speed control lever is in between the full forward position and the full rearward position in the neutral position.

In some embodiments the speed control lever and the steering handle have a substantially similar shape In some embodiments wherein the speed control lever is thumb actuable between the neutral position and the forward position.

In some embodiments the speed control lever includes first and second actuation structure converging toward one another at an angle of approximately ninety-five to one-hundred-seventy degrees with respect to one another. In some versions of those embodiments the first and second actuation structure are upwardly oriented in a direction away from the ground when the speed control lever is in the neutral position.

In some embodiments a pivot bracket pivotably couples the speed control lever to the steering structure.

In some embodiments the steering handle includes a transition portion extending between the first handgrip structure and the second handgrip structure.

In some embodiments the speed control lever is pivotably coupled to the steering structure.

Generally, in another aspect, an earth working apparatus having a speed control system is provided that includes a self propel system, a steering structure, and a speed control lever. The self propel system provides the apparatus with powered movement over the ground at a forward variable speed and at a reverse variable speed. The steering structure extends rearwardly from the apparatus and includes a steering handle having a first handgrip structure and a second handgrip structure converging toward one another at an angle of approximately one-hundred to one-hundred-seventy degrees with respect to one another. The speed control lever is pivotably coupled to the steering structure, operatively coupled to the self propel system, and includes a first actuation structure. The speed control lever has a neutral position whereby the apparatus is not provided with powered movement, a full forward position whereby the apparatus is provided with powered movement at a full forward speed, and a full reverse position whereby the apparatus is provided with powered movement at a full reverse speed. The speed control lever is most proximal the steering handle in the full forward position, the speed control lever is most distal the steering handle in the full rearward position, and the speed control lever is in between the full forward position and the full rearward position in the neutral position.

In some embodiments the first handgrip and the first actuation structure are in substantially parallel relationship when the speed control lever is in the full forward position. In some versions of those embodiments the speed control lever further comprises a second actuation structure converging toward the first actuation structure at an angle of approximately one-hundred to one-hundred-seventy degrees with respect to the first actuation structure. In some versions of those embodiments the second handgrip structure and the second actuation structure are in substantially parallel relationship when the speed control lever is in the full forward position.

In some embodiments in the neutral position the first actuation structure is more distal the apparatus than the first handgrip structure is to the apparatus.

In some embodiments the steering structure includes support structure extending between the apparatus and the first handgrip structure and the second handgrip structure. In some versions of those embodiments the support structure generally lies in a plane and the first handgrip structure and the second handgrip structure extend in a direction outward from the plane and away from the ground. In some versions of those embodiments the first actuation structure intersects the plane when the speed control lever is in the neutral position.

In some embodiments the first actuation structure is thumb actuable between the neutral position and the full forward position.

In some embodiments the speed control system may be implemented in combination with an aerator having an engine that drives a variable speed reversible hydrostatic drive that drives a differential, which, in turn, drives left and right sets of aerator tine assemblies. This arrangement may enable an operator to closely control the speed and direction in which the tines are driven without having to adjust the engine speed.

An operator walking behind such an aerator may make a very tight turn simply by adjusting the speed control to gradually slow down the aerator while he is walking behind the aerator, holding back on one side of the aerator handle, and allowing the differential to drive the "outside" set of tines at a comfortable, slow speed while the "inside" tines remain substantially stationary, so the aerator easily makes the tight turn. When the turn is completed, the operator may then adjust the same speed control to gradually increase the speed of the aerator tines.

The operator may also optionally reverse the direction in which the tines are driven in order to drive the aerator backwards by adjusting the same control to further adjust the position of a swash plate associated with the hydrostatic drive.

DESCRIPTION

Figure 1:
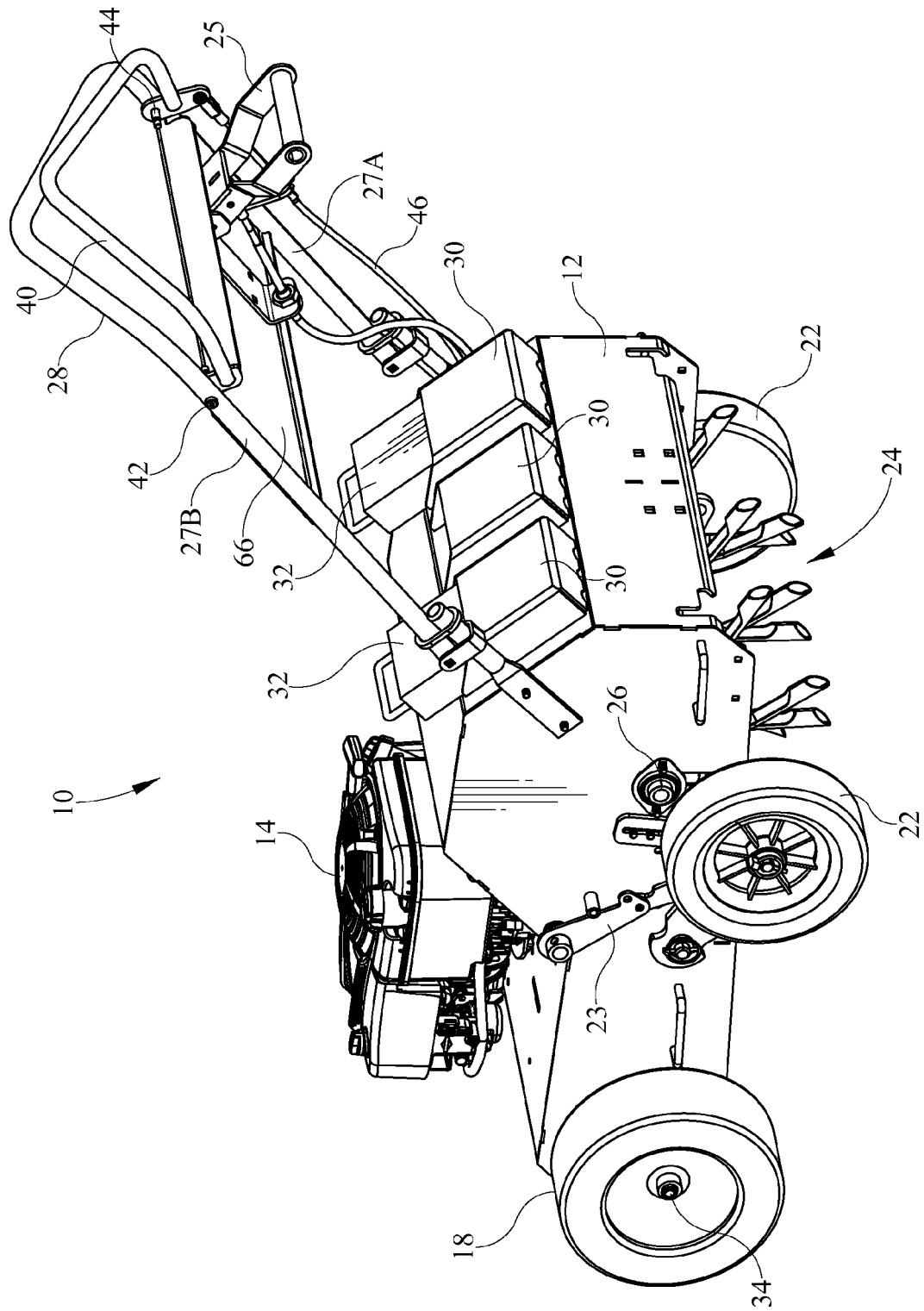
FIG. 1 is a left rear perspective view of an embodiment of walk-behind aerator having a speed control system.
Figure 2:
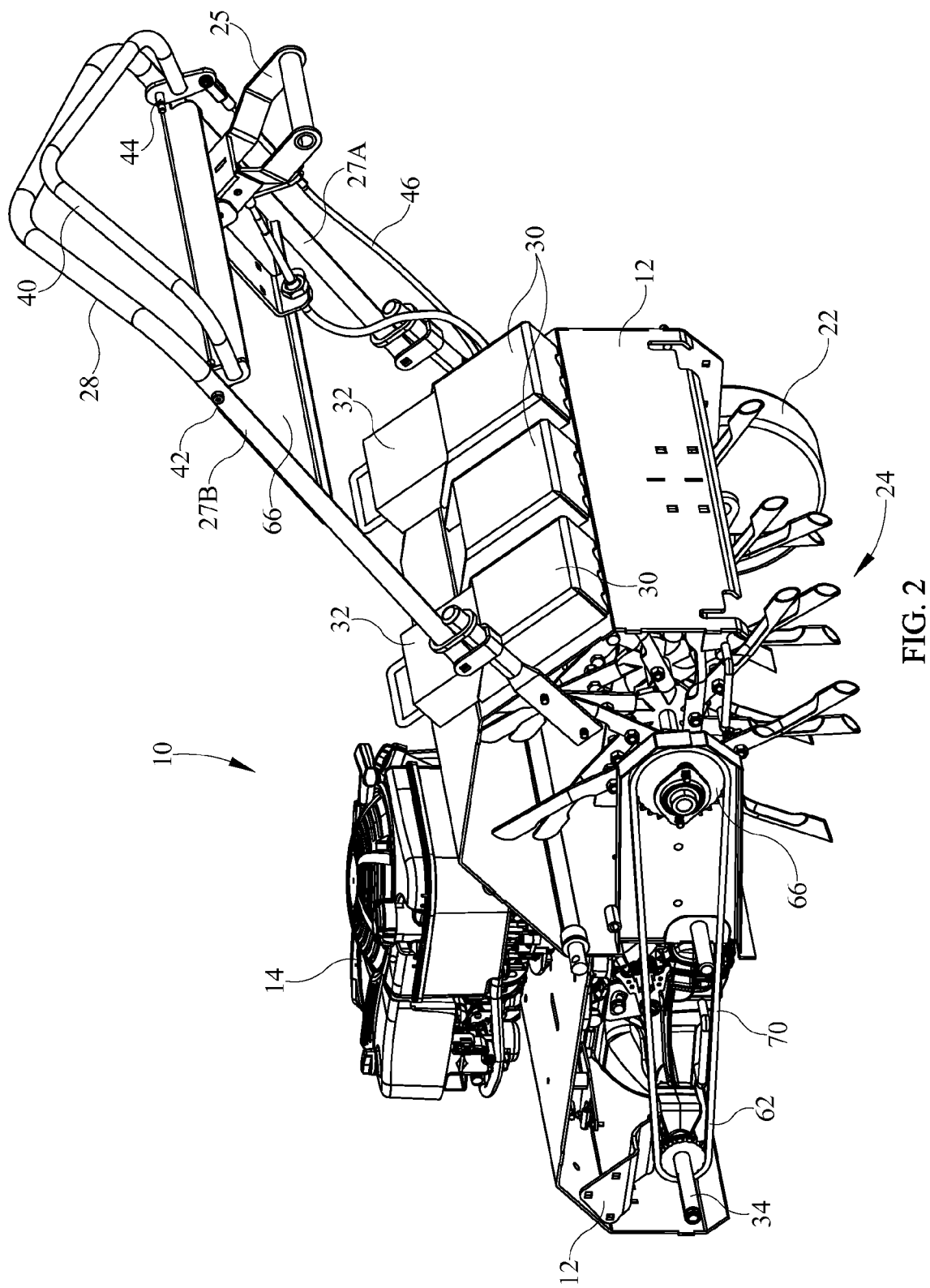
FIG. 2 is the same view as FIG. 1 but with the left side wheels and some of the covers removed or broken away to show some of the inner components of the aerator.

FIGS. 1-9 show one embodiment of a walk-behind soil aerator 10. The aerator 10 includes a frame 12, having front, rear, left and right sides, on which is mounted an engine 14. There are left and right front wheels 18 and left and right rear wheels 22, which support the frame 12. The rear wheels 22 include a height adjustment mechanism 23, which enables them to be raised and lowered relative to the frame 12 by moving a handle 25. Several sets of rotating tines 24 are mounted on the frame 12 for rotation about an axis 26.

Figure 4:
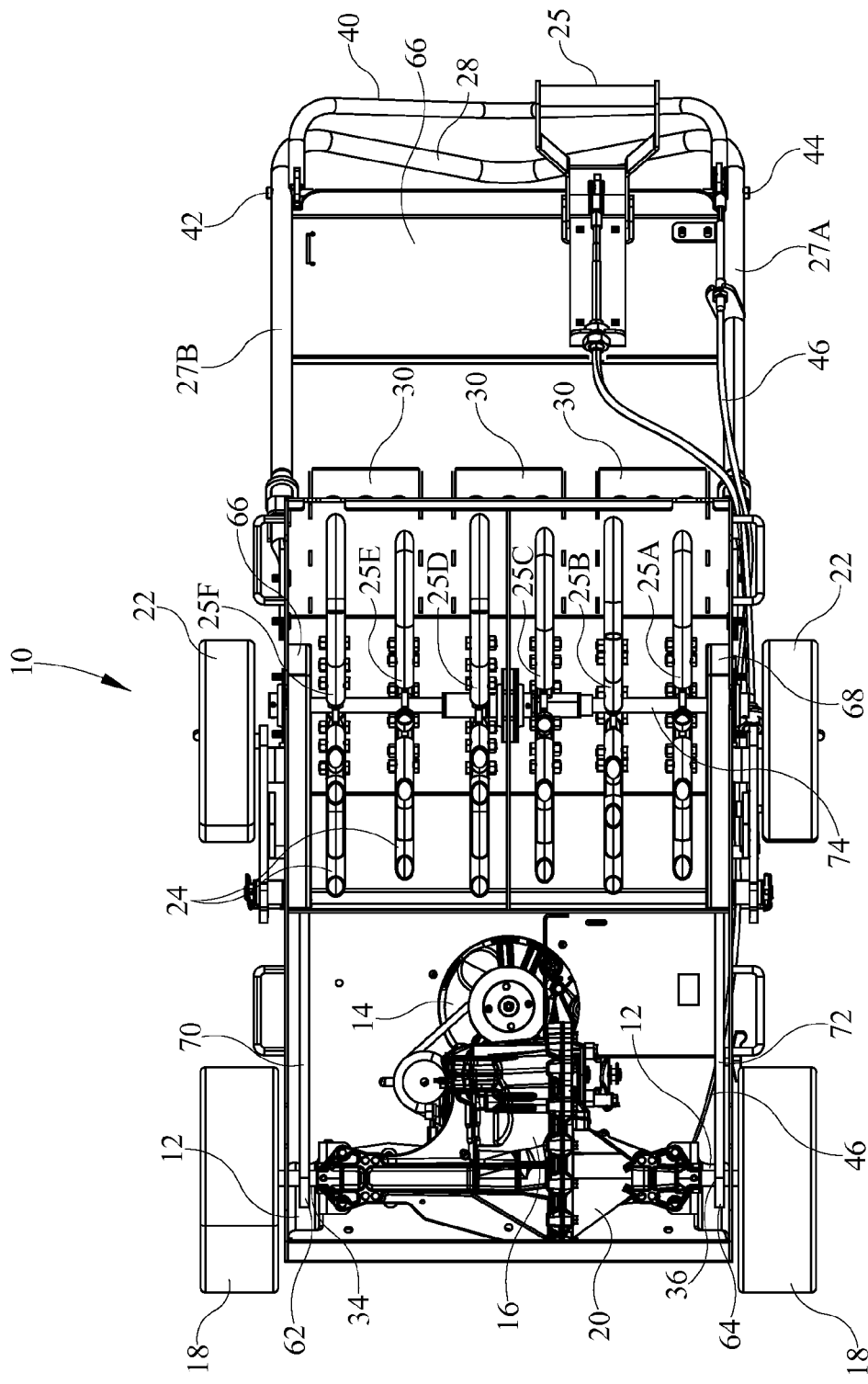
FIG. 4 is a bottom view of the aerator of FIG. 1.
Figure 8:
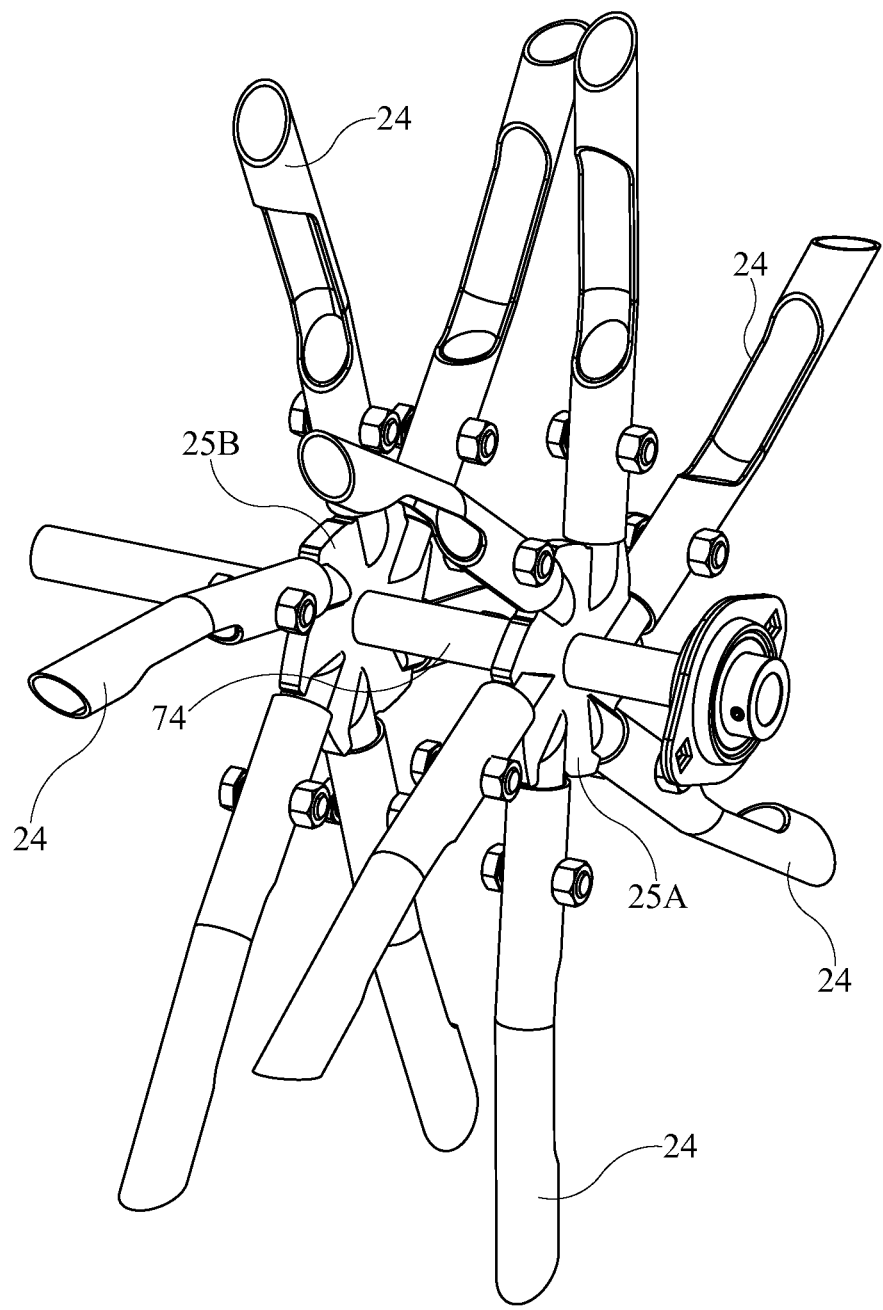
FIG. 8 is a perspective view of one of the tine disk assemblies seen in FIG. 4.
Figure 9:
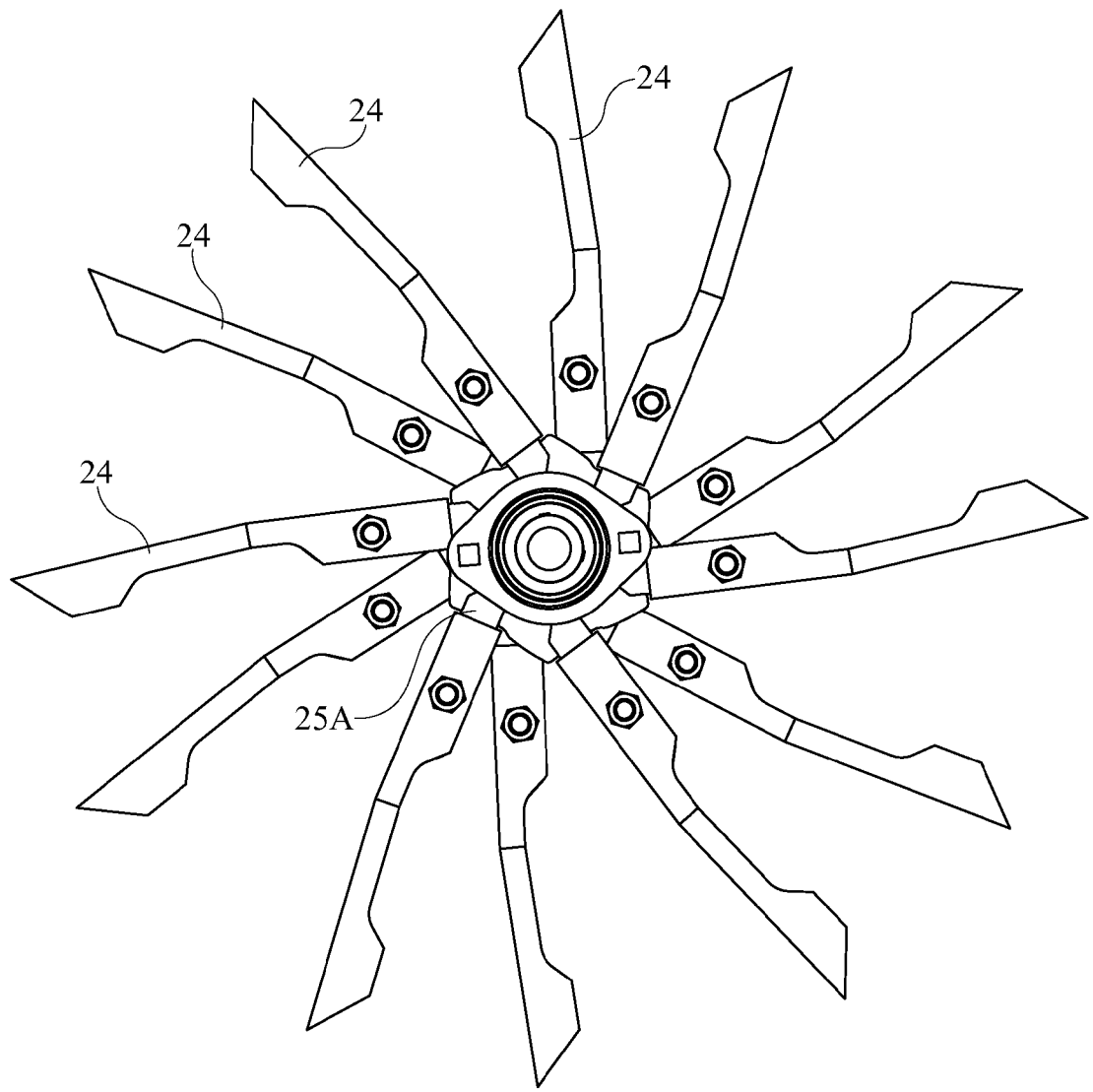
FIG. 9 is an end view of the tine disk assembly of FIG. 8.

FIG. 4 shows six tine disks 25A-F mounted for rotation along a single axis. As shown in FIG. 8, each of the tine disks 25A-F has six radially extending tines 24. The two tine disks 25A, 25B on the farthest right are mounted on a common shaft and are driven together, with the disks being angularly offset from each other so only a single tine 24 will be fully in the ground at any one time, as shown in FIG. 9. The two tine disks 25E, 25F on the farthest left also are mounted on a common shaft and are driven together, with the disks being angularly offset from each other—a mirror image of the farthest right disks 25A, 25B. Each of the central tine disks 25C, 25D is independently freewheeling for rotation about the same axis as the other tine disks.

Figure 3:
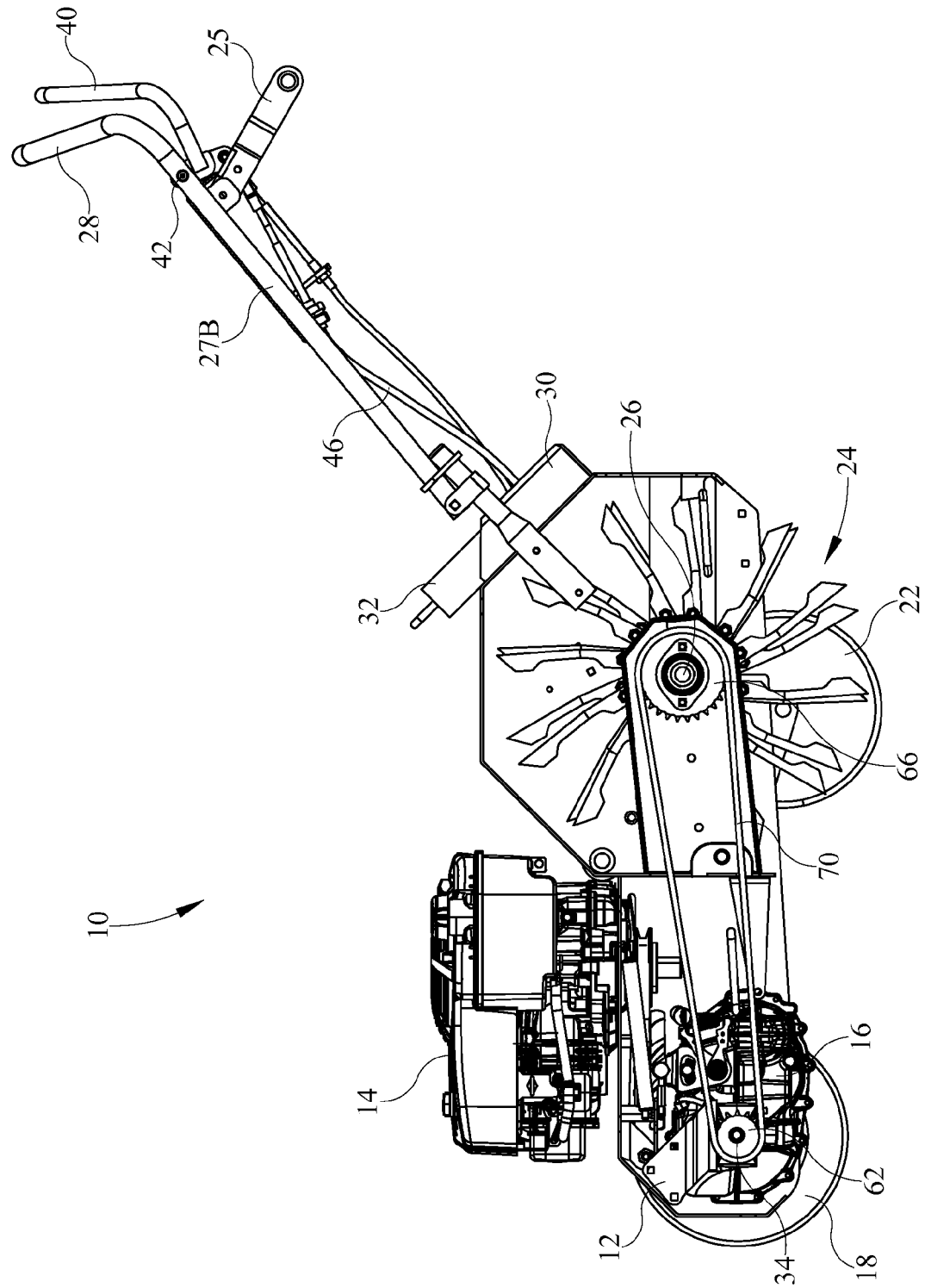
FIG. 3 is a side view of the aerator of FIG. 1.

A variable speed reversible drive 16 transmits power from the engine 14 to the left and right output shafts 34, 36 through a differential 20. The left output shaft 34 drives the left front wheel 18 and the left tine disk assembly, which includes the two left-most tine disks 25E, 25F. The right output shaft 36 drives the right front wheel 18 and the right tine disk assembly, which includes the two right-most tine disks 25A, 25B. FIG. 3 shows a drive chain 70 and drive sprocket 66 for transmitting power from the left output shaft 34 to the left tine disk assembly. The right side is a mirror image of this arrangement, with another drive chain 72 and drive sprocket 68 transmitting power from the right output shaft 36 to the right tine disk assembly (including tine disks 25A, 25B mounted on a shaft 74). The right drive sprocket 68 drives a right tine disk shaft 74 on which the tine disks 25A, 25B are mounted.

Also mounted on the frame 12 is a steering handle 28. A speed control lever 40 is pivotably mounted to the steering handle 28.

Metal pockets 30 mounted on the rear of the frame 12 receive weights 32 to help provide force behind the tines 24 so they will punch into the soil rather than lifting up the aerator 10. The number and amount of weights 32 that are used may depend upon the type of soil, with more weight being used for a hard soil that is difficult to pierce, and less weight being used for a soft soil that is easy to pierce.

A belt transmits power from the rotating shaft of the engine 14 to the variable speed reversible drive 16, which, in this case, is an integrated hydrostatic transaxle drive. The operation of one example of an integrated hydrostatic transaxle drive that includes a hydraulic pump, a hydraulic motor, a differential, and first and second output shafts all housed in a single housing is described in U.S. Pat. No. 6,253,637, "Hauser et al.", which is incorporated herein by reference. Various types of integrated hydrostatic transaxle drives are available on the market, and the present embodiment uses an integrated hydrostatic transaxle drive manufactured by Hydro-Gear of Sullivan, Ill.

The rotating output shaft of the engine 14 drives the variable displacement hydraulic pump (not shown) within the hydrostatic transaxle drive 16, which drives the hydraulic motor (not shown) located within the same housing, which drives the differential 20, also within the same housing, which, in turn, drives the output shafts 34, 36. This integrated hydrostatic transaxle drive 16 uses a swashplate, as shown and described in the Hauser et al. patent, to control the speed and direction of the differential 20, which, in turn, controls the speed and direction of the output shafts 34, 36 without having to change the speed of the engine 14. As is well-known, the differential 20 allows one of the output shafts 34, 36 to be stationary or to be driven at a slower speed, while the other output shaft 36, 34 is driven at a faster speed, which is very helpful when driving around a turn. Of course, for normal operation in a straight line, the differential 20 drives both output shafts 34, 36 at the same speed.

A single control cable 46 controls the angular position of the swash plate which controls the displacement of the hydraulic pump and thus the speed of the hydraulic motor. Moving the swashplate in a first direction gradually reduces the speed of rotation of the hydraulic motor, and in turn, the speed of rotation of the differential, which is driven by the hydraulic motor, so it changes continuously and gradually from a high speed in the forward direction to gradually slower and slower speeds, to a neutral position, at which the drive causes the output shafts 34, 36 to stop rotating, and then to a reverse direction in which the hydraulic motor, differential 20, and output shafts 34, 36 are driven in reverse. Moving the swashplate in the opposite direction reverses that process, going from the reverse direction to the neutral (stopped) position, and then gradually accelerating in the forward direction from a very slow speed to faster speeds.

While this particular embodiment of a hydrostatic drive has the variable displacement hydraulic pump, hydraulic motor, differential, and output shafts all located within a single housing, which makes a compact package, it is not required. Some of the various functional components could alternatively be housed separately.

It should be noted that this type of hydrostatic transaxle drive has been used to drive the wheels of lawn equipment in the past, such as the wheels of self-propelled lawnmowers. However, it has not been used to drive aerator tines as shown here, because, as explained above, it was understood that it was necessary to have a clutch to be able to disengage the tines to make them freewheeling in order to minimize their interference when making tight turns or other difficult maneuvers. The hydrostatic transaxle drive itself does not provide for freewheeling.

Figure 5:
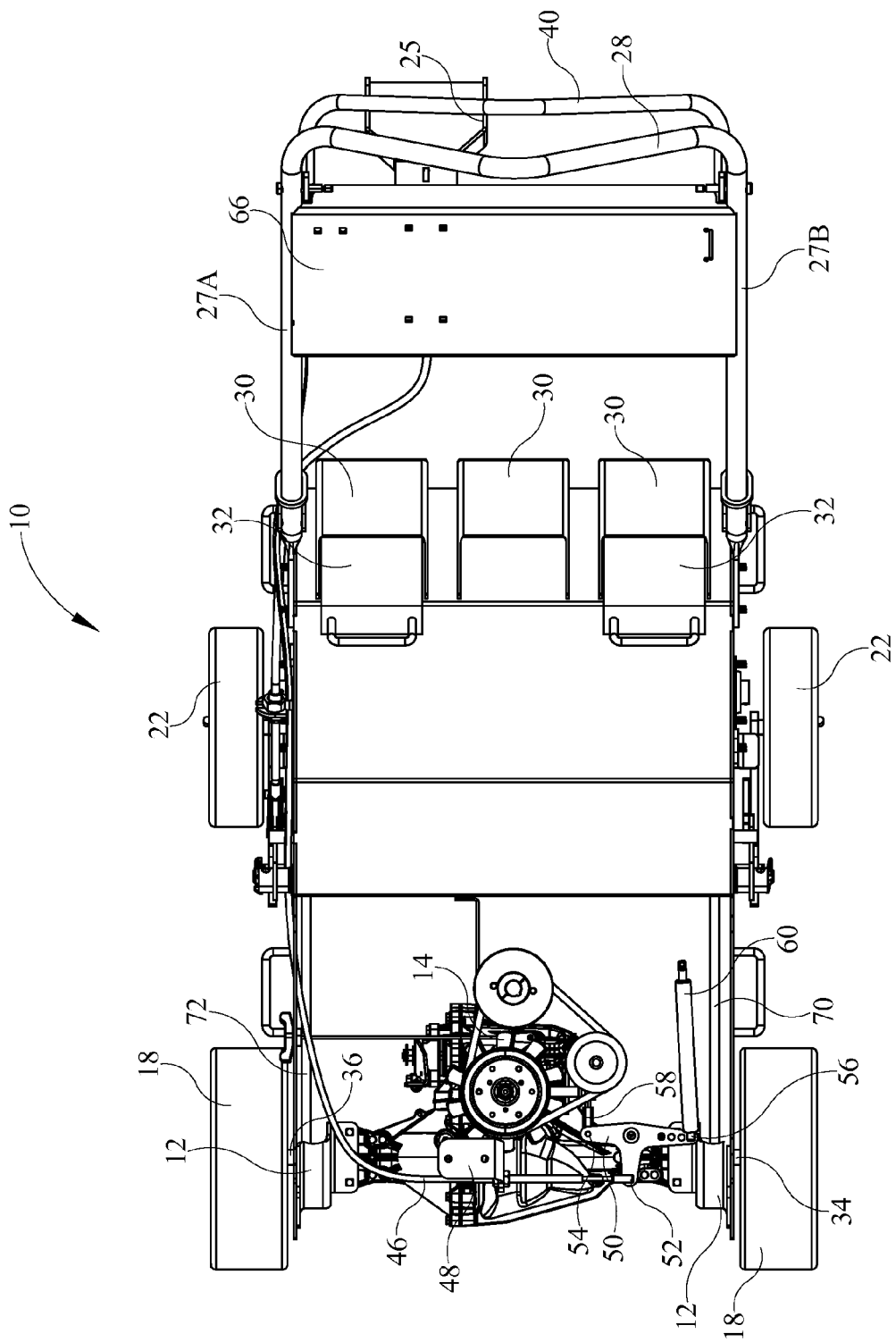
FIG. 5 is a plan view of the aerator of FIG. 1, with some of the covers removed to show some of the inner components.
Figure 5A:
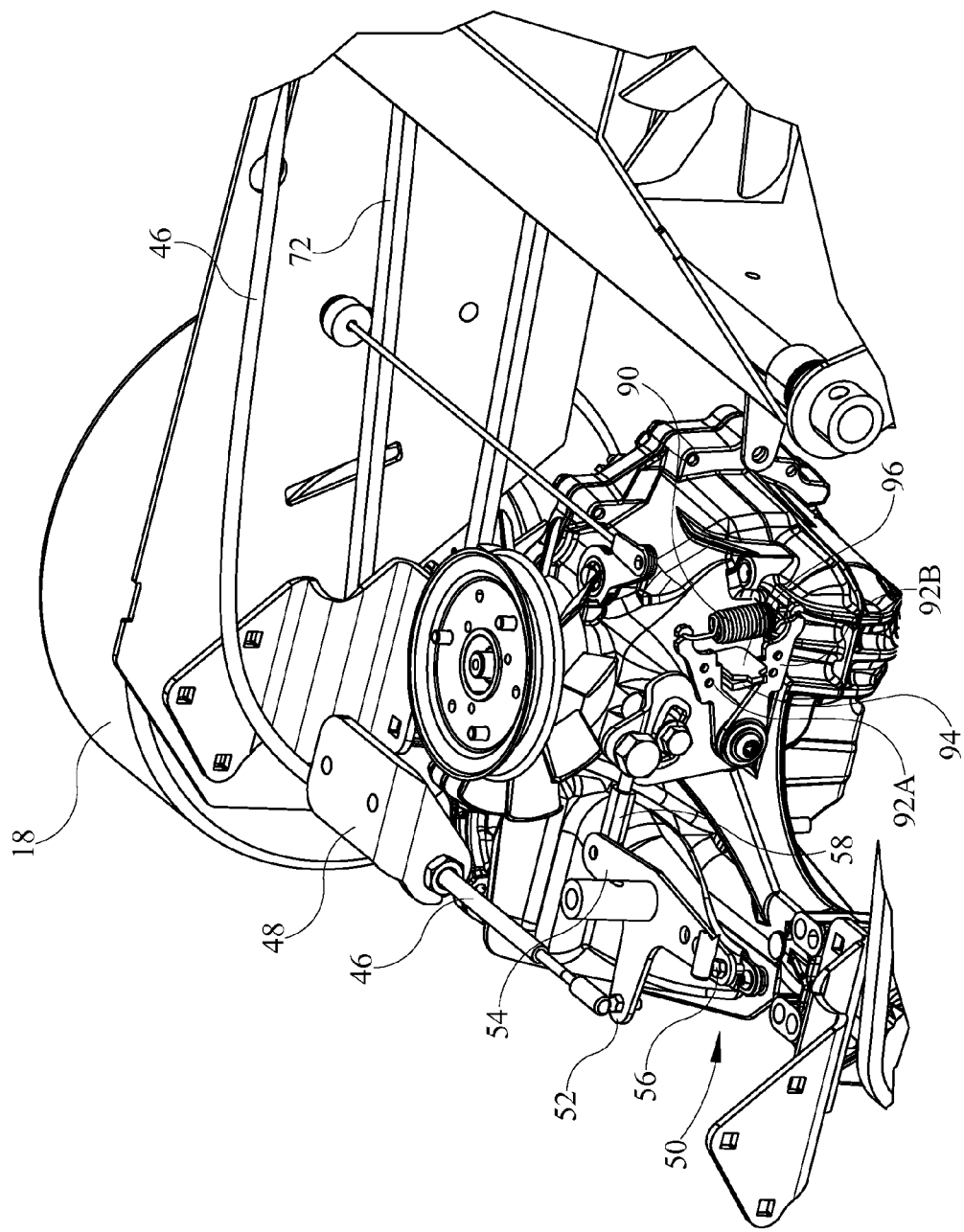
FIG. 5A is an enlarged view of a portion of FIG. 5 with a dampener removed.
Figure 6:
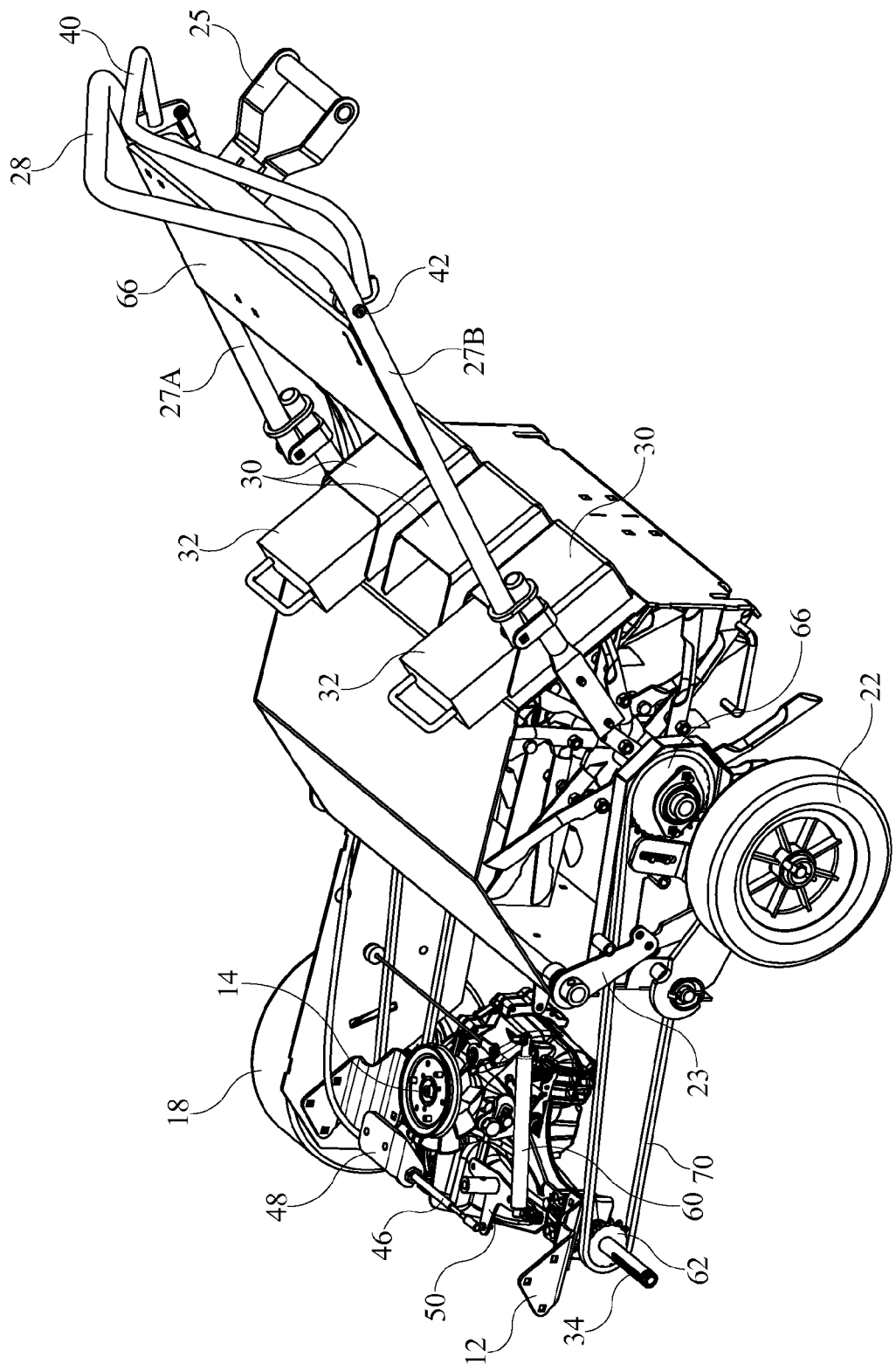
FIG. 6 is a perspective view of the aerator of FIG. 1 with the front left wheel and some of the covers removed.
Figure 7:
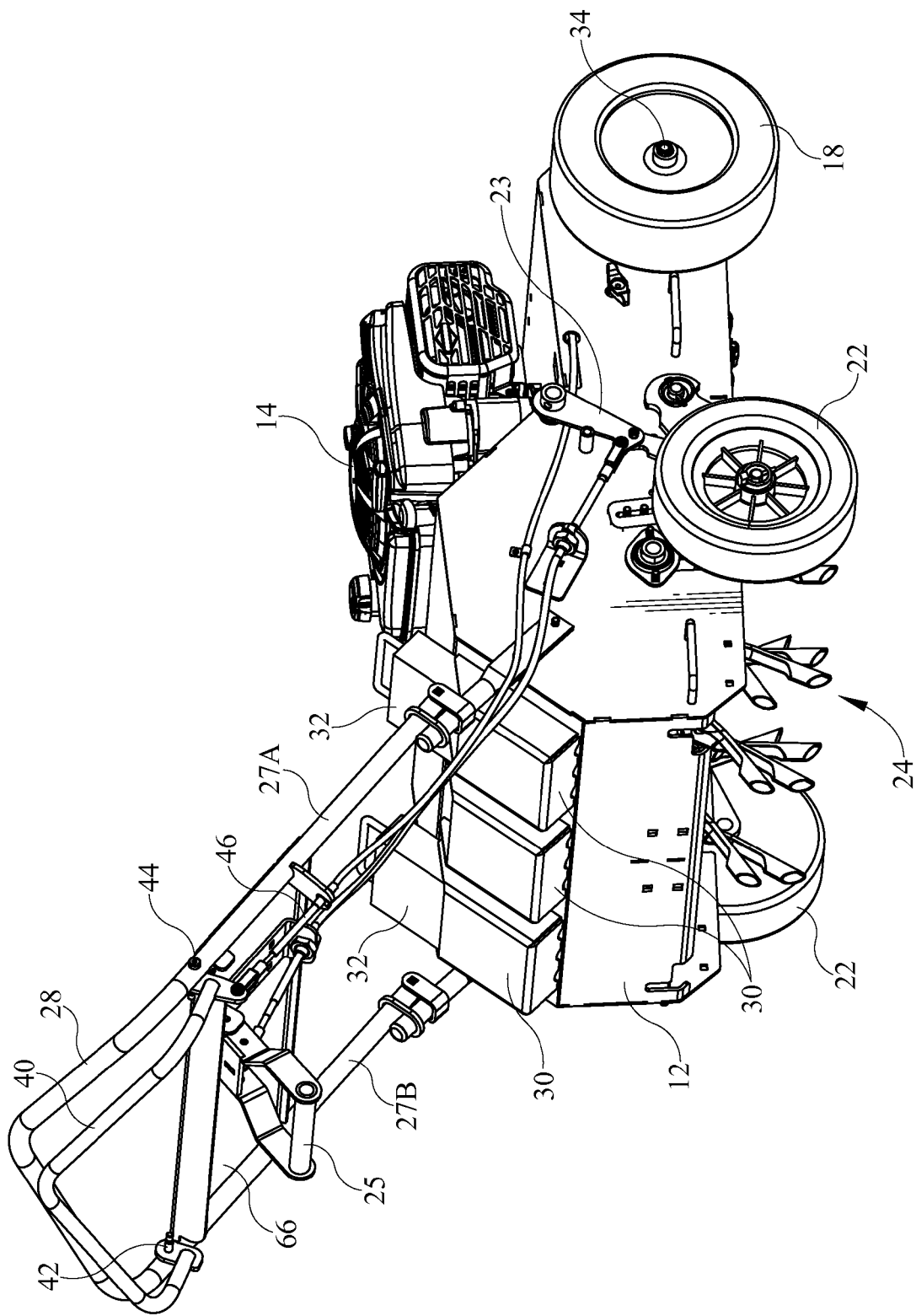
FIG. 7 is a right rear perspective view of the aerator of FIG. 1.

As shown best in FIG. 6, the steering handle 28 has a generally inverted "V" shape, with left and right sides angled rearwardly and downwardly from a central apex. The speed control lever 40 has a similar inverted "V" shape and is pivotably mounted to the steering handle 28 at pivot points 42, 44. A control cable 46 extends from the speed control lever 40 through a bracket 48 (shown in FIG. 5A) and connects to a first leg 52 of a pivoting "T" shaped lever arm 50. A second leg 54 of the lever arm 50 connects to the swashplate (not shown) via a rod 58. The third leg 56 of the lever arm 50 connects to a damper 60. The damper 60 is removed in FIG. 5A.

As the operator grasps the speed control lever 40 and pushes it forward toward the steering handle 28, pivoting the speed control lever 40 about the pivot points 42, 44, he is pulling the cable 46, which then pulls on the first leg 52 of the lever arm 50. This pushes on the rod 58 which is connected to the swashplate, moving the swashplate in a first direction such that the hydraulic pump within the hydrostatic drive 16 drives the hydraulic motor, which drives the differential 20, which drives the first and second output shafts 34, 36, which drive the left and right front wheels 18 and the left and right tine assemblies 25E and F, 25A and B, respectively, so as to propel the aerator 10 in the forward direction. When the operator releases the speed control lever 40, the unit is biased by means of a spring 90 attached to the transaxle, (See FIG. 5A) so as to return the swashplate to the neutral position where there is no output from the hydraulic pump, and the output shafts are stopped. If the operator grasps the speed control lever 40 and pulls back on it, the cable 46 moves in the opposite direction, pushing on the first arm 52 of the lever arm 50, moving the swashplate in a second direction, opposite the first direction, such that the pump drives the hydraulic motor in the reverse direction, which, in turn, drives the differential and the output shafts in the back-up or reverse direction. The spring 90 is attached between a first leg 92A and a second leg 92B. A movable tab 94 moves upwardly and movably engages the first leg 92A when the swashplate is moved in the first direction via speed control lever 40. The movable tab 94 moves downwardly and movably engages the second leg 92B when the swashplate is moved in the second direction via speed control lever 40. The spring 90 acts to return the legs 92A and 92B back to a neutral position, and resultantly return the swashplate to a neutral position when no force is applied to speed control lever 40 by a user. In the neutral position the legs 92A and 92B contact a stationary tab 96.

This makes the control of the aerator 10 very intuitive and easy for the operator. To go forward, he simply pushes on the speed control lever 40, moving it toward the steering handle 28. The more he pivots the speed control lever 40 forward toward the steering handle 28, the faster the aerator moves forward. To go backwards, he simply pulls back on the speed control lever 40, reducing the speed to the neutral position, and then reversing the direction of the drive. To stop, he simply releases the speed control lever 40 and the biasing spring 90 returns the swashplate to the neutral position where the hydraulic pump provides no output to the hydraulic motor. The ergonomically-designed inverted "V"-shaped steering handle 28 makes steering easy as well by placing the operator's hands and body in position to pull on one side of the steering handle 28 while pushing on the other side of the steering handle 28. In alternative embodiments steering handle shapes that vary in one or more respects from the specifically depicted steering handle 28 may be utilized that still enable the operator to pull on one side of the steering handle while pushing on the other side of the steering handle. To operate the aerator 10, the operator starts up the engine 14 and raises the rear wheels 22 via the height adjustment lever 25 so that the tine assemblies 24 are resting on the ground. He then grasps the speed control lever 40 and pushes it forward toward the steering handle 28, which moves the swashplate in a first direction (via the cable 46 connected to the lever arm 50) so as to drive the aerator in the forward direction.

To make a tight radius turn, the operator eases up on the speed control lever 40 to slow down the aerator 10. He then holds back on one side of the aerator 10 while pushing on the other side of the aerator 10 to urge the aerator 10 into a turn. The differential in the drive 16 allows the "outside" wheels and tine assembly to rotate while the "inside" wheels and tine assembly remain substantially stationary. The "inside" tine assembly has twin tine disks, but only one core tine 24 of one of the twin tine disks (See FIG. 9) is likely to be fully embedded in the ground at any given time, so the aerator 10 essentially pivots on this embedded core tine as it completes the turn. The middle tine disks 25C, 25D simply free-wheel as required to complete the turn. The "outside" wheels and tine assembly drive forward to assist the operator in making the turn. Once the turn is completed, the operator stops pulling back on the steering handle 28, so the differential transfers power equally to the "inside" and "outside" wheels and tine assemblies to start driving the aerator 10 once again in a straight line. The operator then pushes the speed control lever 40 forward toward the steering handle 28 to speed up the driving for the straight section.

To have the aerator 10 back up, the operator releases the speed control lever 40 such that the biasing spring 90 can return the swashplate to the neutral position wherein the aerator 10 comes to a stop. The operator then pulls back on the speed control lever 40, pulling it away from the steering handle 28, which moves the swashplate in a second direction, opposite the first direction, to drive the wheels and tines of the aerator 10 in reverse.

Figure 10:
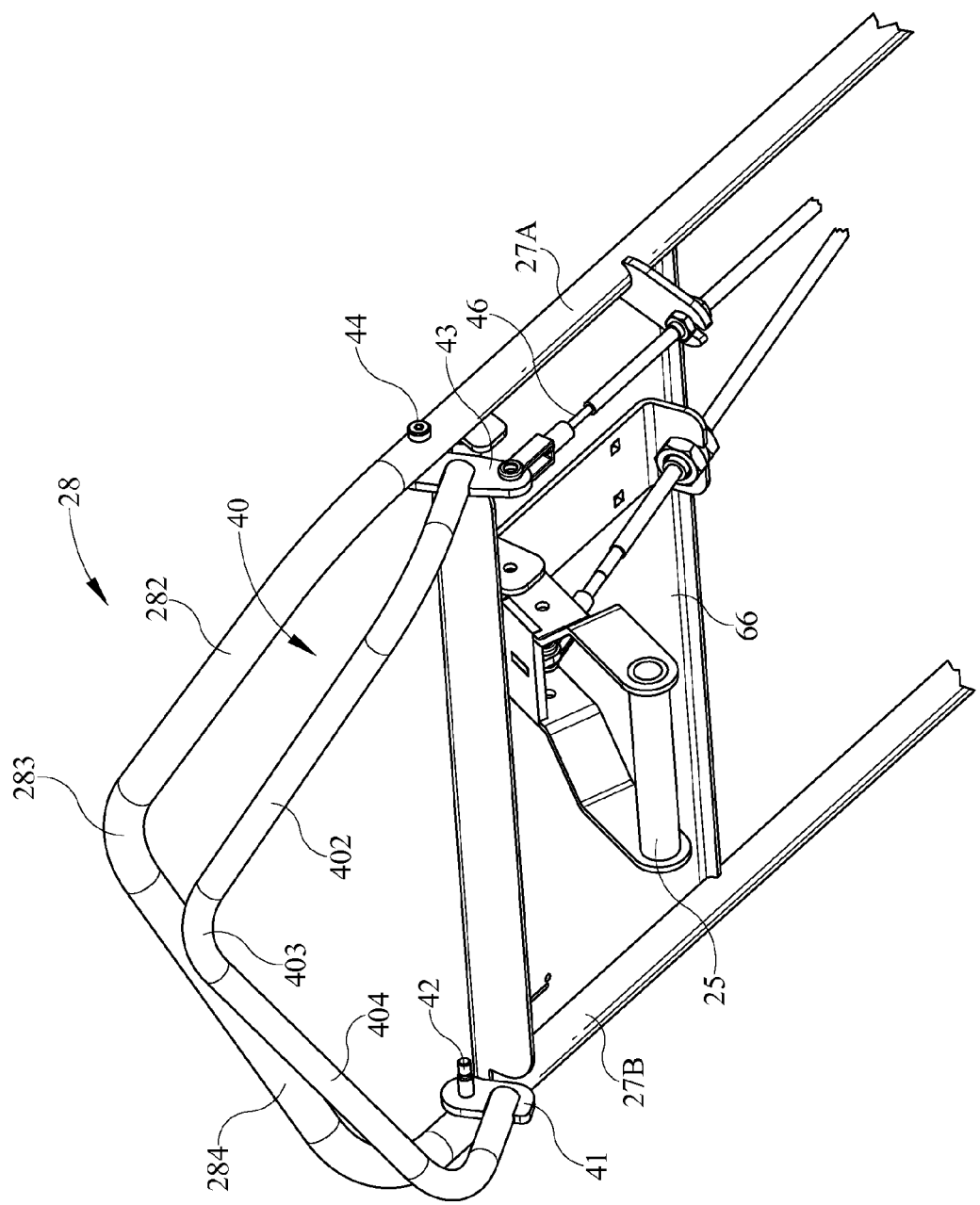
FIG. 10 is an enlarged perspective view of a speed control system of the aerator of FIG. 1, with a speed control lever in a neutral position.
Figure 11A:
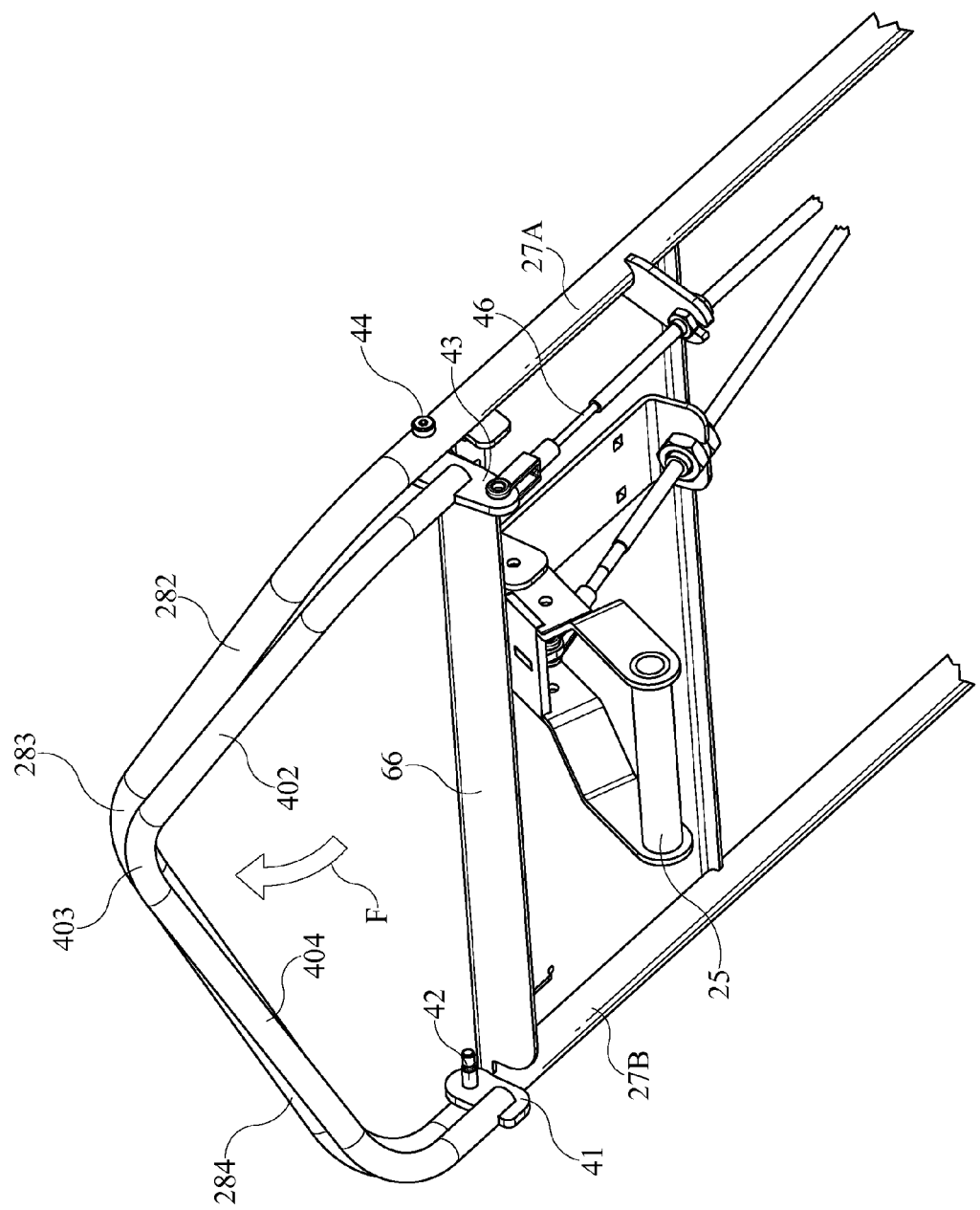
FIG. 11A is an enlarged perspective view of the speed control system of FIG. 10, with the speed control lever in a full forward position.
Figure 11B:
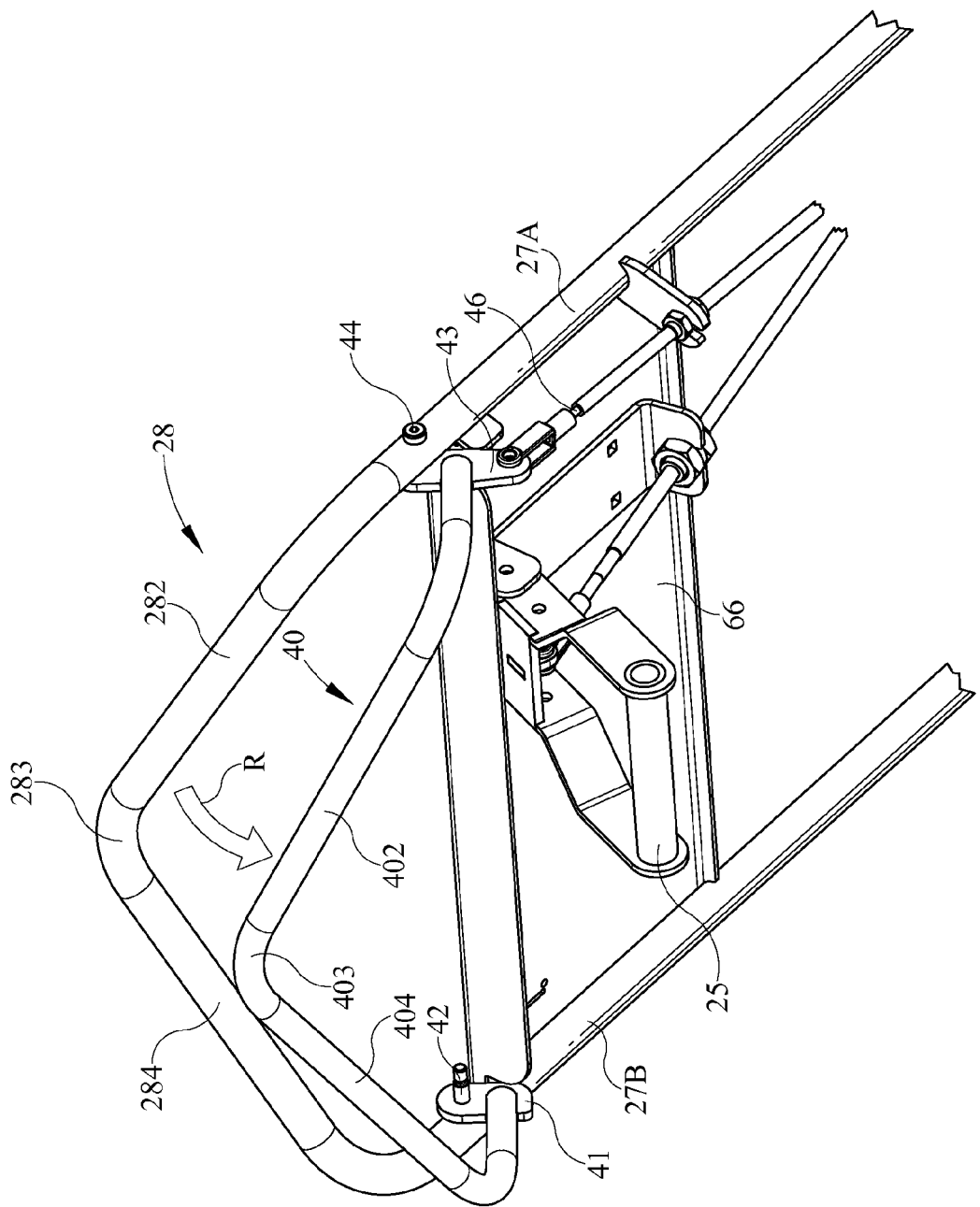
FIG. 11B is an enlarged perspective view of the speed control system of FIG. 10, with the speed control lever in a full reverse position.

Referring to FIGS. 10, 11A, and 11B, an enlarged rear perspective view of a speed control system of the aerator 10 is provided. In FIG. 10 the speed control lever 40 is depicted in the neutral position, in FIG. 11A the speed control lever 40 is depicted in the full forward position, and in FIG. 11B the speed control lever 40 is depicted in the full reverse position. The speed control lever 40 is also depicted in the neutral position in FIGS. 1-5 and 6-7.

The steering handle 28 is coupled to handle support bars 27A and 27B that are coupled to and extend from the frame 12 of the aerator 10. The handle support bars 27A and 27B are substantially parallel to one another and substantially lie in and define a plane. The steering handle 28 includes right and left handgrip structure 282 and 284 that converge toward one another at an angle. Being placed at a converging angle with respect to one another enables an operator to pull on one of the handgrip structures 282, 284 while pushing on the other of the handgrip structures 282, 284, thereby facilitating turning of the aerator 10. In the depicted embodiment the handgrip structures 282, 284 are at approximately a one-hundred-and-twenty degree angle with respect to one another. However, one of ordinary skill in the art, having had the benefit of the present disclosure will appreciate that other converging angles may be utilized. For example, one of ordinary skill in the art may consider factors such as the spacing of the handle support bars 27A and 27B, the desired length of the handgrip structures 282, 284, and/or the vertical positioning of the handgrip structures 282, 284 in determining a converging angle that will enable an operator to, inter alia, satisfactorily pull on one side of the steering handle 28 while pushing on the other side of the steering handle 28 to assist in navigating a turn. One of ordinary skill in the art, having had the benefit of the present disclosure, will also appreciate that although substantially tubular handgrip structures 282, 284 are depicted, other shapes may be utilized in alternative embodiments. For example, in alternative embodiments the handgrip structures 282, 284 may be multi-sided, elliptical, and/or may contain projections and/or grooves.

A transition portion 283 is provided between the handgrip structures 282, 284. In the depicted embodiment the transition portion 283 is in the form of an arcuate apex. However, one of ordinary skill in the art, having had the benefit of the present disclosure will appreciate that the transition portion 283 may be another shape and/or size. For example, in some embodiments the transition portion 283 may be in the form of a convex trough, may be substantially straight, may include one or more troughs and/or one or more apexes, and/or may include one or more projections. Also, in some embodiments the transition portion 283 may be omitted. For example, in some embodiments the handgrip structures 282, 284 may converge directly into one another or a gap may be provided between the handgrip structures 282, 284. Accordingly, in alternative embodiments the steering handle 28 may take on other shapes beside the specific shape depicted herein.

The speed control lever 40 includes right and left actuation structures 402 and 404 that converge toward one another at an angle. In the depicted embodiment the right and left actuation structures 402 and 404 are at approximately a one-hundred-and-twenty degree angle with respect to one another. However, one of ordinary skill in the art, having had the benefit of the present disclosure will appreciate that other converging angles may be utilized in other embodiments. For example, one of ordinary skill in the art may consider factors such as the spacing of the handle support bars 27A and 27B, the length of right and left actuation structures 402 and 404, and/or the vertical positioning of the right and left actuation structures 402 and 404 in determining a converging angle that will enable an operator to satisfactorily actuate the speed control lever 40 while utilizing the steering handle 28. One of ordinary skill in the art, having had the benefit of the present disclosure, will also appreciate that other shapes may be utilized in alternative embodiments. A transition portion 403 is provided between the right and left actuation structures 402 and 404. In the depicted embodiment the transition portion 403 is in the form of an arcuate apex. However, one of ordinary skill in the art, having had the benefit of the present disclosure will appreciate that the transition portion 403 may be another shape and/or size. Also, in some embodiments the transition portion 403 may be omitted. Also, in some embodiments one of the right and left actuation structures 402 and 404 may be omitted.

As depicted in various Figures and, in particular in FIG. 3, the handgrip structures 282, 284 extend outward from the plane in which the steering handle supports 27A and 27B generally lie. In the depicted embodiments the handgrip structures 282, 284 extend outward from the plane at approximately a seventy degree angle as viewed in FIG. 3. In alternative embodiments the handgrip structures 282, 284 may extend outward at a different angle. Also, the right and left actuation structures 402 and 404 extend through and outward from the plane in which the steering handle supports 27A and 27B lie when the speed control lever 40 is in the neutral position through the full forward position. In alternative embodiments steering handle supports 27A and/or 27B may be curvate and/or non-planar but may optionally still generally lie in and define a plane. Alternative support structure may optionally be utilized to couple steering handle 28 to frame 12.

The speed control lever 40 is pivotably coupled to the handle support bar 27A at pivot point 44 via pivot bracket 43 and handle support bar 27B at pivot point 42 via pivot bracket 41. In alternative embodiments the speed control lever 40 may be coupled, pivotably or non-pivotably, to other structure of the speed control system. For example, in alternative embodiments the speed control lever 40 may be translatable within a track of the speed control system that is coupled to, for example, a cross plate 66. The speed control lever 40 may be translatable within the track between neutral, full reverse, and full forward positions and operatively coupled to the control cable 46 to thereby adjust the control cable 46 between neutral, full reverse, and full forward positions. In FIG. 10 no force is being supplied to the speed control lever 40 and it is in the neutral position. As described herein, a biasing spring 90, via control cable 46, may maintain the speed control lever 40 in the neutral position. In some embodiments springs at the pivot connection of speed control lever 40 may additionally or alternatively maintain the speed control lever 40 in the neutral position.

In FIG. 11A, full forward force, symbolized by force arrow F, is being applied to the speed control lever 40, thereby causing the control cable 46 to pull on the swash plate in a direction that drives the aerator forward at a full forward speed. The movement of cable 46 between the neutral and full forward position can be seen with reference to FIGS. 10 and 11A. It is understood that a user may actuate the speed control lever 40 to any desired of a plurality of positions between the neutral position and the full forward position, thereby driving the aerator 10 at variable forward speeds. The speed control lever 40 may be prevented from being actuated beyond the full forward position by, inter alia, handle 28, contact between brackets 41, 43 and the cross plate 66, tension on cable 46, and/or stop structure that may optionally be interposed between the speed control lever 40 and the handle 28. In some embodiments, the distance between the handle 28 and the speed control lever 40 may be sufficiently small to enable an operator to have his fingers and/or palms placed on handgrip structures 282, 284 and utilize his thumbs to contact the speed control lever 40 and move it forward. In some embodiments the distance between the handle 28 and the speed control lever 40 may be six inches or less and in some embodiments the distance may be four inches or less. In some embodiments, the force required to actuate control lever 40 may be sufficiently small to enable an operator to have his fingers and/or palms placed on handgrip structures 282, 284 and utilize his thumbs to contact the speed control lever 40 and move it forward.

In FIG. 11B, full rearward force, symbolized by rearward force arrow R, is being applied to the speed control lever 40, thereby causing the control cable 46 to push on a swash plate in a direction that drives the aerator rearward at a full rearward speed. The movement of cable 46 between the neutral and full rearward position can be seen with reference to FIGS. 10 and 11B. It is understood that a user may actuate the speed control lever 40 to any desired of a plurality of positions between the neutral position and the full rearward position, thereby driving the aerator 10 at variable rearward speeds. The speed control lever 40 may be prevented from being actuated beyond the full rearward position by, inter alia, handle 28, contact between brackets 41, 43 and cross plate 66, tension on cable 46, and/or stop structure that may optionally be interposed between the speed control lever 40 and the handle 28.

In the depicted embodiment the distance between the neutral position of the speed control lever 40 and the full forward position of the speed control lever 40 is greater than the distance between the neutral position of the speed control lever 40 and the full rearward position of the speed control lever 40. This may enable faster forward movement of the aerator 10, while preventing potentially unsafe rearward movement speeds. In some embodiments the distance between the neutral position of the speed control lever 40 and the full forward position of the speed control lever 40 may be approximately two times as great as the distance between the neutral position of the speed control lever 40 and the full rearward position of the speed control lever 40. Although a control cable 46 is depicted herein, one of ordinary skill in the art, having had the benefit of the present disclosure, will recognize that other linking structure may be utilized in alternative embodiments to operatively couple the speed control lever 40 to the hydrostatic drive.

It will be obvious to those skilled in the art that modifications may be made to the embodiments described above without departing from the scope of the present invention as claimed. For example, one of ordinary skill in the art, having had the benefit of the present disclosure, will recognize that one or more aspects of the speed control system and/or the self propel system described herein may be implemented in other outdoor power equipment units such as, for example, other outdoor walk behind earth working units.

What is claimed is:

1. A speed control system for an earth working apparatus, comprising:
 a steering structure including first steering handle support structure, second steering handle support structure, and a steering handle;
 said first steering handle support structure and said second steering handle support structure being in substantially parallel spaced relation with one another and generally defining a first plane;
 said steering handle coupled to said first steering handle support structure and said second steering handle support structure, said steering handle comprising a first handgrip structure and a second handgrip structure, said first and second handgrip structure extending generally in a second plane, said second plane being non-parallel to said first plane, wherein said first handgrip structure and said second handgrip structure converge toward one another at a non-parallel angle with respect to one another;
 a speed control lever movably coupled to said steering structure and coupled to a control cable, said speed control lever having a neutral position when substantially no force is applied to said control cable by a user, a full forward position when full forward force is applied to said control cable in a first direction by said user, and a full reverse position when full rearward force is applied to said control cable in a second direction by said user; wherein said speed control lever is most proximal said steering handle in said full forward position, said speed control lever is most distal said steering handle in said full rearward position, and said speed control lever is in between said full forward position and said full rearward position in said neutral position.

2. The speed control system of claim 1 wherein said speed control lever and said steering handle have a substantially similar shape.

3. The speed control system of claim 1 wherein said steering handle limits movement of said speed control lever when said speed control lever is in said full forward position.

4. The speed control system of claim 3 wherein said speed control lever directly contacts said steering handle when said speed control lever is in said full forward position.

5. The speed control system of claim 1 wherein said first handgrip structure and said second handgrip structure are disposed at an angle with respect to one another wherein said angle is in the range of approximately one-hundred to approximately one-hundred-seventy degrees.

6. The speed control system of claim 1 wherein said steering handle includes a transition portion extending between said first handgrip structure and said second handgrip structure.

7. The speed control system of claim 6 wherein said transition portion is a curvate apex.

8. The speed control system of claim 1 wherein a spacing between said first handgrip structure and said speed control lever in said neutral position is sufficiently small to allow simultaneous single hand contact of said handgrip structure and said speed control lever.

9. The speed control system of claim 8 wherein said spacing is less than or equal to four inches.

10. The speed control system of claim 1 wherein said steering handle, said first steering handle support structure, and said second steering handle support structure are monolithically formed.

11. The speed control system of claim 1 wherein said second plane is at approximately a forty-five to ninety degree angle with respect to said first plane.

12. The speed control system of claim 1 wherein said speed control lever intersects said first plane in said neutral position.

13. The speed control system of claim 1 wherein said control cable is coupled to a biasing spring, whereby said biasing spring biases said speed control lever in said neutral position when no force is applied to said speed control lever.

14. An earth working apparatus, comprising:
- a self propel system, wherein said self propel system provides said apparatus with powered movement over the ground at a forward variable speed and at a reverse variable speed;
- a steering structure extending rearwardly from said apparatus, said steering structure including a steering handle having a first handgrip structure and a second handgrip structure converging toward one another at an angle of approximately ninety-five to one-hundred-seventy degrees with respect to one another; and
- a speed control lever movably coupled to said steering structure and operatively coupled to said self propel system;
- said speed control lever having a neutral position whereby said apparatus is not provided with powered movement, a full forward position whereby said apparatus is provided with powered movement at a full forward speed, and a full reverse position whereby said apparatus is provided with powered movement at a full reverse speed; wherein said speed control lever is most proximal said steering handle in said full forward position, said speed control lever is most distal said steering handle in said full rearward position, and said speed control lever is in between said full forward position and said full rearward position in said neutral position.

15. The earth working apparatus of claim 14 wherein said speed control lever and said steering handle have a substantially similar shape.

16. The earth working apparatus of claim 14 wherein said speed control lever is thumb actuable between said neutral position and said forward position.

17. The earth working apparatus of claim 14 wherein said speed control lever includes first and second actuation structure converging toward one another at an angle of approximately ninety-five to one-hundred-seventy degrees with respect to one another.

18. The earth working apparatus of claim 17, wherein said first and second actuation structure are upwardly oriented in a direction away from the ground when said speed control lever is in said neutral position.

19. The earth working apparatus of claim 14 wherein a pivot bracket pivotably couples said speed control lever to said steering structure.

20. The earth working apparatus of claim 14 wherein said steering handle includes a transition portion extending between said first handgrip structure and said second handgrip structure.

21. The earth working apparatus of claim 14 wherein said speed control lever is pivotably coupled to said steering structure.

22. The earth working apparatus of claim 14 wherein said self propel system includes a variable speed reversible hydrostatic drive.

23. An earth working apparatus having a speed control system, comprising:
- a self propel system, wherein said self propel system provides said apparatus with powered movement over the ground at a forward variable speed and at a reverse variable speed;
- a steering structure extending rearwardly from said apparatus, said steering structure including a steering handle having a first handgrip structure and a second handgrip structure converging toward one another at an angle of approximately one-hundred to one-hundred-seventy degrees with respect to one another;
- a speed control lever pivotably coupled to said steering structure and operatively coupled to said self propel system, said speed control lever including a first actuation structure;
- said speed control lever having a neutral position whereby said apparatus is not provided with powered movement, a full forward position whereby said apparatus is provided with powered movement at a full forward speed, and a full reverse position whereby said apparatus is provided with powered movement at a full reverse speed, wherein said speed control lever is most proximal said steering handle in said full forward position, said speed control lever is most distal said steering handle in said full rearward position, and said speed control lever is in between said full forward position and said full rearward position in said neutral position.

24. The earth working apparatus of claim 23 wherein said first handgrip and said first actuation structure are in substantially parallel relationship when said speed control lever is in said full forward position.

25. The earth working apparatus of claim 24 wherein said speed control lever further comprises a second actuation structure converging toward said first actuation structure at an angle of approximately one-hundred to one-hundred-seventy degrees with respect to said first actuation structure.

26. The earth working apparatus of claim 25 wherein said second handgrip structure and said second actuation structure are in substantially parallel relationship when said speed control lever is in said full forward position.

27. The earth working apparatus of claim 23 wherein said steering structure includes a support structure that generally lies in a plane and said first handgrip structure and said second handgrip structure extend in a direction outward from said plane and away from the ground.

28. The earth working apparatus of claim 27 wherein said first actuation structure intersects said plane when said speed control lever is in said neutral position.

29. The earth working apparatus of claim 23 wherein said first actuation structure is thumb actuable between said neutral position and said full forward position.

30. The earth working apparatus of claim 23 wherein said self propel system includes a variable speed reversible hydrostatic drive.

* * * * *